UNITED STATES PATENT OFFICE.

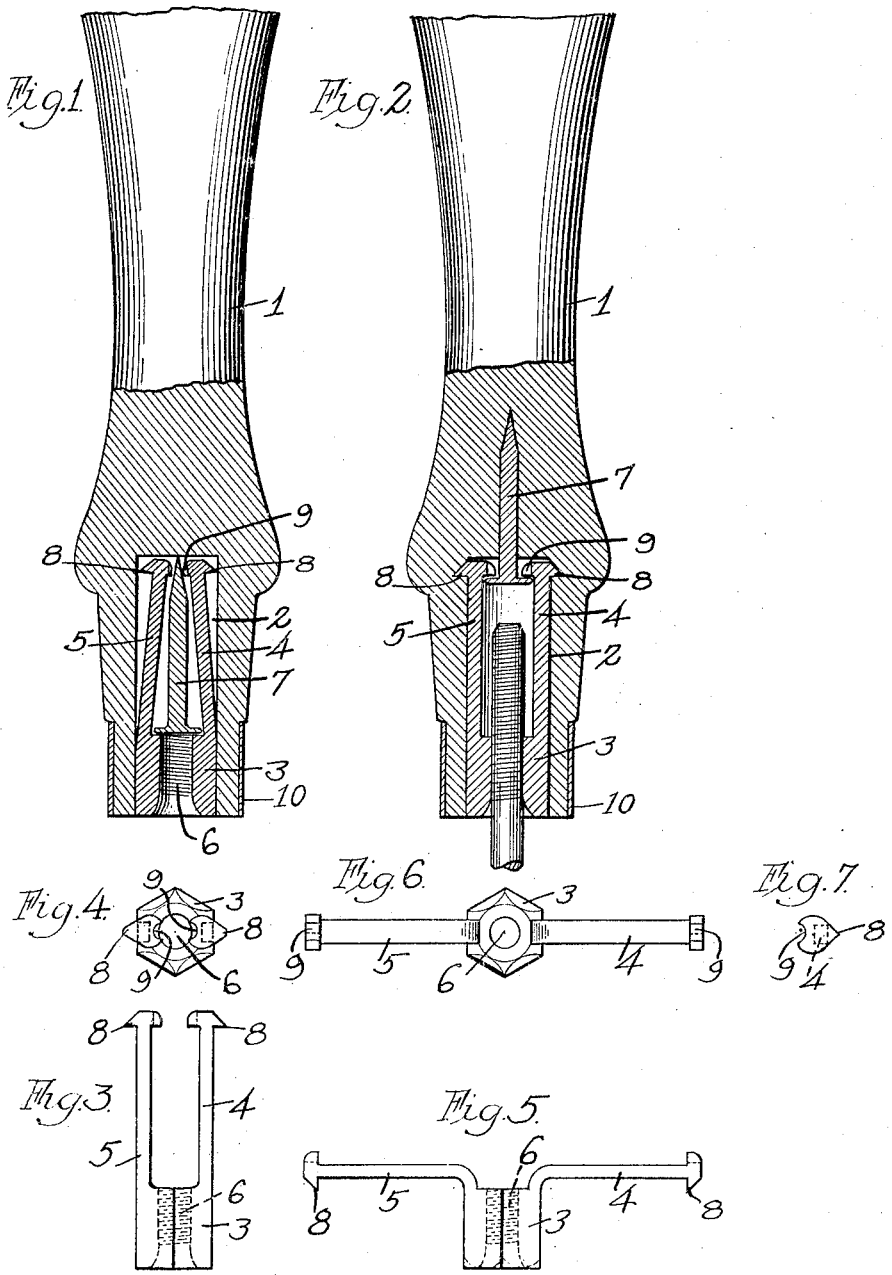

HORATIO S. EARLE, OF DETROIT, MICHIGAN, ASSIGNOR TO H. S. EARLE MANUFACTURING CO., OF DETROIT, MICHIGAN, A CORPORATION OF MICHIGAN.

HANDLE FOR TOOLS.

1,343,552.   Specification of Letters Patent.   Patented June 15, 1920.

Application filed March 10, 1917. Serial No. 153,813.

*To all whom it may concern:*

Be it known that I, HORATIO S. EARLE, a citizen of the United States, residing at Detroit, county of Wayne, State of Michigan, have invented a certain new and useful Improvement in Handles for Tools, and declare the following to be a full, clear, and exact description of the same, such as will enable others skilled in the art to which it pertains to make and use the same, reference being had to the accompanying drawings, which form a part of this specification.

This invention relates to handles for tools, such as grass hooks, sickles or cross cut saws and similar handles in which the handle may be secured to the tool by means of a threaded shank or tang, and an object of the invention is a handle of simple and inexpensive form recessed to receive a tang or shank and an insertible nut held from movement therein or withdrawal therefrom. A further object of the invention is a handle having a recess in the end thereof, a nut insertible therein provided with prongs adapted to be driven into the wall of the recess by means of a fastening device preventing withdrawal of the nut from the handle under normal strains. These and other objects and the several novel features of the invention in its preferred form are hereinafter more fully described and claimed and shown in the accompanying drawings in which—

Figure 1 is an elevation partly in section showing my improved handle with the nut inserted in the recess preparatory to the fastening thereof therein.

Fig. 2 is a view showing the parts in secured position.

Fig. 3 is an elevation of one form of the nut.

Fig. 4 is an end view thereof.

Fig. 5 is an elevation of another form of the nut.

Fig. 6 is an end view thereof.

Fig. 7 is an end view of one of the prongs formed integrally with the nut.

Similar characters refer to similar parts throughout the drawing and specification.

In the usual handle of the character to which this invention relates the handle is apertured throughout its length, and the shank or tang securing the handle to the implement passes through the entire length of the handle and is provided with a nut on the outer end. Such construction requires an extreme length of tang or shank, and is thus more expensive than the form herein described, and furthermore, the nut is readily loosened and lost from the lower end of the handle.

In the device herein shown the shank is comparatively short in length and should be of such form that the handle may be screwed thereonto against a set of some character either by a lug or washer formed on the shank itself or by the handle end engaging against the blade as is shown in my pending application, Serial Number 91,582, filed April 17, 1916. Various methods of providing a set for the handle or limiting the movement of the handle relative to the movement of the shank may be employed, as may be found necessary, without departing from the spirit of this invention. As is shown in the drawing the handle 1 is recessed longitudinally at one end thereof as indicated at 2, the recess being preferably circular in cross section. A nut 3 is employed for use in this recess and is of the usual hexagonal form, as will be understood from Figs. 4 and 6, the distance across the flats being substantially equal to the diameter of the recess so that on forcing the nut into the recess the nut tightly engages the wall and is held from rotation. The nut is preferably made of malleable iron, and formed integrally therewith are two oppositely positioned prongs 4 and 5 which may be formed to extend in parallel relation from one end of the nut, or they may be formed after the manner shown in Figs. 5 and 6 with the prongs extending in opposite directions in the same plane. If formed in the latter manner the prongs must be bent to parallel position as indicated in Fig. 3 prior to insertion in the recess 2. The nut has a threaded central aperture 6 and is preferably provided with an unthreaded enlargement on the forward end to facilitate the insertion of a tool as hereinafter mentioned. In positioning the nut within the recess a nail 7 is first positioned between the prongs, which are bent to position shown in Fig. 1, and when the nail is positioned with the head thereof adjacent the threaded aperture 6 the nut is driven into the recess until the prongs engage the bottom thereof or until the face of the nut is positioned in the desired relation relative to the end of the handle, the recess being of a depth to allow the nut to be positioned, as may be desired, longitudinally of the handle. When the nut with the nail between the prongs, as shown in Fig. 1, has been positioned a tool for instance, similar to a nail set is inserted in the aperture 6 and the nail is driven into the handle to position shown in Fig. 2. It is to be noted that the ends of the prongs 4 and 5 are provided with pointed ends 8 extending laterally each way from each prong and provided with inwardly projecting parts. The ends of the prongs 4 and 5 are, therefore, somewhat flattened, as will be understood from Fig. 7, having the pointed end 8, as hereinafter mentioned, and having a substantially circular notch 9 formed in the inwardly projecting part, the two notches 9 of the two prongs lying adjacent one to the other, as will be understood from Figs. 1, 2 and 3. These notches 9 allow the nail 7 to be driven between the prong ends. In fact the nail may be of such length that when in the position shown in Fig. 1 the point thereof rests in and is supported between the two prongs and is, therefore, inserted in the recess in proper relation to the prongs and is guided to proper position for insertion in the handle. The head of the nail is substantially equal to the distance between the prongs at the base adjacent the nut and it will be noted that when the nut is positioned, these prongs are forced to an angle one to the other to allow the points thereof to pass within the recess. On subsequently driving the nail home the head thereof spreads the prongs driving the points 8 into the material of the handle upon opposite sides, as will be seen in Fig. 2. By this arrangement, the nut is securely held from withdrawal from the recess both by reason of the nail engaging under the inner edges of the flattened head and of the prongs thereof engaging in the handle.

From the foregoing description it becomes evident that the device is of utility first in providing a cheap and efficient device for securing the nut without the possibility of accidental removal by any ordinary usage, and further is of great utility especially in devices having long handles, as for instance, scythes or corn hooks and the like, in which the usual form of fastening would necessitate a long tang or shank to pass through the handle or a pointed shank adapted to be driven into a handle end, which type of fastening is readily loosened in use. The saving in material in my improved handle over such former devices requiring the longer shank is considerable and is also more readily assembled.

It is further to be noted, that the shank, when threaded into the nut, may engage the head of the nail and prevent any possibility of its working loose, and that the several elements coöperate to secure the several parts in the relative position. By providing a ferrule about the end of the handle as indicated at 10 the possibility of splitting the handle by insertion of the nut or nail is obviated.

Having thus briefly described my invention, its utility and mode of operation, what I claim and desire to secure by Letters Patent of the United States is—

1. A handle for tools consisting of a body portion having a longitudinal recess at one end, a threaded nut insertible in the recess, a pair of prongs attached to the nut extending into the recess and terminating adjacent the bottom thereof, the prongs having oppositely positioned laterally extending points, the prongs being adapted to be bent inwardly to pass freely into the recess to allow ready insertion of the nut therein, each prong also having an inwardly projecting part at the end, a spreader having a head positioned between the prongs and adapted to be driven into the handle at the bottom of the recess, the head being of a diameter to spread the prongs as it is driven and seating against the inwardly projecting parts of the prongs, and a threaded tang for the nut.

2. A handle for tools consisting of a body portion having a longitudinal recess at one end thereof, a nut insertible in the recess and having a threaded aperture, a plurality of prongs attached to the nut, the prongs having flattened ends provided with inwardly projecting notched parts and with points extending outwardly therefrom, the prongs being adapted to be sprung or bent inwardly to pass freely into the recess whereby the nut may be seated therein, and a nail or the like having a head of a diameter substantially equal to the distance between the prongs at the point of attachment to the nut and of a length whereby the point may rest in the notches in the prong ends, the said nail being adapted to be driven into the handle at the bottom of the recess whereby the head thereof may spread the prongs to force the points into the wall of the recess and also engage beneath the inwardly projecting parts of said prong ends to prevent the displacement of the nut in the recess.

3. A handle for tools comprising a body portion having a longitudinal recess at one end, a threaded nut insertible in the recess and a threaded tang for the nut, said nut having inwardly extending prongs upon opposite sides terminating with flattened end portions extending each side of each prong, the outer sides being pointed, a headed retainer member adapted for insertion into the handle at the bottom of the recess between the prongs subsequent to the positioning of the nut, the head engaging the inwardly extending parts of the flattened ends and the end spreading the prongs to force the points thereof into the walls of the recess, the nut and portion of the recess for receiving the same being of a character to prevent rotation of the nut in the handle.

4. A handle for tools comprising a body portion having a longitudinal recess at one end, a threaded nut insertible in the recess and a threaded tang for the nut, the nut having inwardly extending prongs terminating with flattened inwardly extending end portions, the outer face of the prongs being adapted for retaining engagement with the wall of the recess, a headed retainer member adapted for insertion into the handle at the bottom of the recess, the retainer being positioned between the prongs and the head of the retainer on insertion forcing the prongs outwardly to retaining position and engaging the inwardly extending portions of the prongs thereby preventing displacement of the nut subsequent to its insertion.

In testimony whereof I sign this specification.

HORATIO S. EARLE.